Aug. 14, 1945. G. W. MATHEWS 2,382,084
QUICK FREEZING APPARATUS
Filed March 20, 1942 2 Sheets-Sheet 1
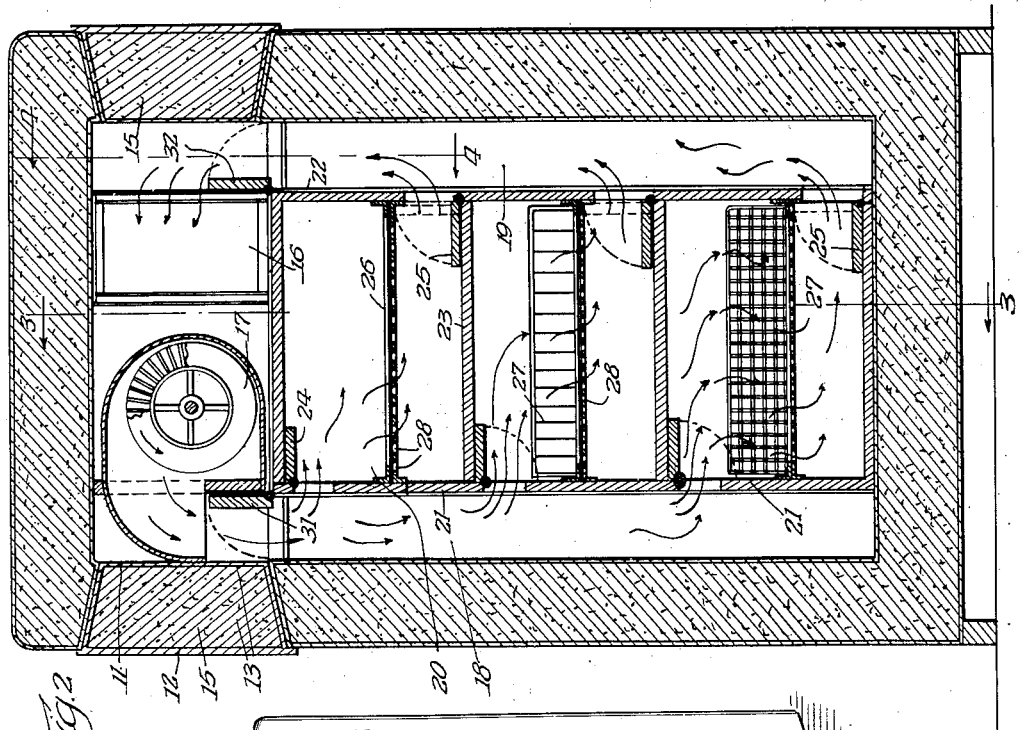
Inventor:
George W. Mathews
By Kent W. Worrell
Atty.

Aug. 14, 1945.  G. W. MATHEWS  2,382,084
QUICK FREEZING APPARATUS
Filed March 20, 1942  2 Sheets-Sheet 2
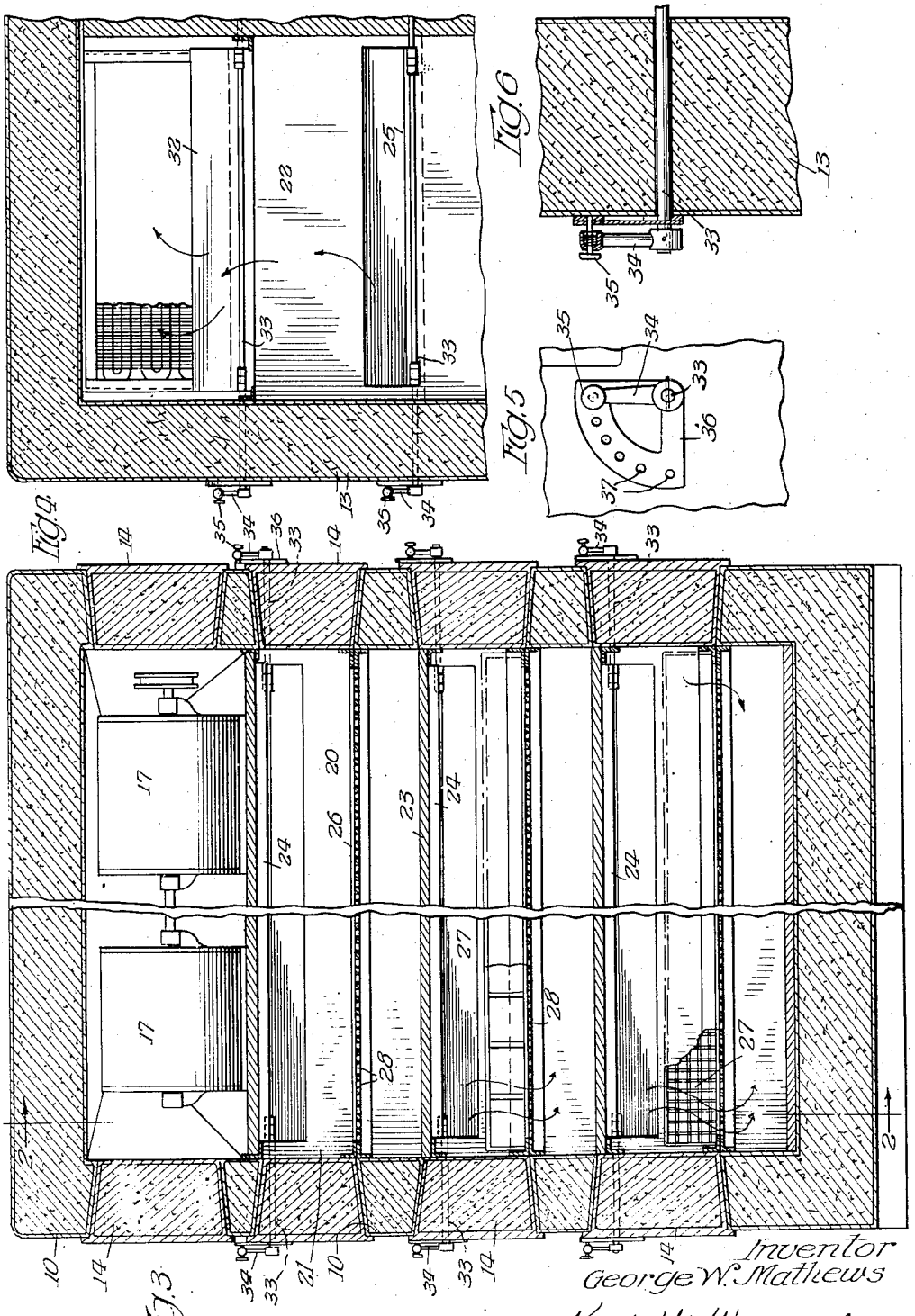
Inventor
George W. Mathews
By Kent W. Worrell
Atty.

Patented Aug. 14, 1945

2,382,084

UNITED STATES PATENT OFFICE 2,382,084

QUICK FREEZING APPARATUS

George W. Mathews, Chicago, Ill.

Application March 20, 1942, Serial No. 435,479

7 Claims. (Cl. 62—102)

This invention relates in general to quick freezing apparatus and has more particular reference to the preservation and quick freezing of foods such as fruits, vegetables, meats, fish, and the like, although it may have a more general use wherever applicable.

An important object of the invention is to provide a construction in which a cooling circulation is insured throughout each part of every compartment of the freezer regardless of whether one or all of the compartments are being used.

A further object of the invention is to provide means for selectively closing any compartment from the circulation of cooling air, for loading or discharging material therefrom with a minimum loss of the cooling effect or cooling medium.

A further object of the invention is to provide means for quickly defrosting the cooling unit and for closing it temporarily from the circulation of cooling air through the normal cooling passages.

A still further object is to provide a cabinet construction which lends itself readily to the building or addition of compartments both laterally and end to end so that a commercial freezing capacity can be built up as desired, and the compartments may be filled at one end and the contents removed at the other end of each compartment or passed through a plurality of compartments arranged in corresponding end to end relation.

Other objects of the invention will apear in the specification and will be apparent from the accompanying drawings in which, Fig. 1 is a perspective of a cabinet in accordance with the invention;

Fig. 2 is a cross-sectional view taken on the line 2—2 of Fig. 3;

Fig. 3 is a longitudinal section taken on the line 3—3 of Fig. 2;

Fig. 4 is a partial section taken on the line 4—4 of Fig. 2; and

Figs. 5 and 6 are front and sectional views respectively showing door controlling means for the air travel.

In the commercial quick freezing of foods, it is found that ordinary freezing apparatus or equipment, even when particularly intended for this purpose, does not meet certain requirements for insuring a thorough circulation of the cooling medium through the material, nor does it provide adequate means for controlling separate compartments without loss of the cooling medium in charging and discharging it, nor is it designed or intended for operation and combination with other sections for expansion laterally or in tandem or end to end relation. The present invention overcomes these objections and difficulties by providing a heat exchange unit having an air circulator for charging one or more compartments from a common inlet and with a common air return to the unit, in which each compartment may be separately controlled and each has a flow restriction means between the inlet and outlet such that the flow capacity of all the units is less than that of the circulator, thereby insuring that each compartment receives adequate cooling at all times and under all circumstances throughout the entire area of the compartment.

Referring now more particularly to the drawings, each separate section 10 of the cabinet freezer preferably has an enclosing casing with inner and outer walls 11 and 12 with a space between them filled with a heat insulating material 13. At the front casing are a number of hinged doors 14 for access to each separate compartment, and the heat exchange unit, if desired, and at the sides of the casing are hinged doors 15 for defrosting purposes.

At the top within the casing is a refrigerating unit comprising a heat exchange unit 16 and a motor driven cooling air circulator 17 which may be of any desired or suitable construction for producing the desired result.

In the casing below the refrigerating or cooling unit are a number of freezing compartments preferably extending to the bottom of the casing and providing a common pressure passage 18 at one side leading from the circulator 17 and an opposite common return passage 19 leading back to the cooling unit. Each compartment 20 comprises walls 21 and 22 forming the opposite passages 18 and 19, and a bottom wall 23 for separating the compartments. In the wall 21, at the top of each compartment is an inlet opening and a door 24 for closing it and at the bottom of the opposite wall 22 is an opening and a door 25 for controlling the opening. Extending in each compartment is a suitable support 26 for a tray 27, and below the support is a perforated partition 28 interposed between the inlet and outlet for restricting the passage of air or a cooling medium through this compartment, and for insuring a distribution of the cooling medium throughout the entire space of the compartment.

Instead of having a separate bottom plate of perforated or foraminous restricted openings, the tray itself may have such openings in the bottom or a separate plate of a flow restricting nature may be placed upon the support 26.

The arrangement of the perforate plates 28 in all of the compartments is such that their combined flow capacity is slightly less than the capacity of the circulator 17 which delivers the refrigerant at the top of passage 18, so that a slight pressure may be built up at the inlet to insure a flow of the cooling medium through each compartment. If the door 24, or both doors 24 and 25 in the compartment are closed, this will cut off the flow of the cooling medium to that compartment, but each of the other compartments will receive the cooling medium and the compartment from which circulation has been cut off may have its door 14 open for charging or discharging material therefrom without loss of pressure and without loss of the cooling medium from the circulator.

To defrost the cooling unit, doors 15 are provided in the casing at opposite sides of the unit, and in the passages 18 and 19 are doors 31 and 32 respectively to close the passages from circulation of the cooling medium therein, thus resulting in a quick defrosting action for the unit without material loss of refrigeration in the compartments below.

To control the doors 24 and 25 for each compartment and the passage doors 31 and 32 from the outside of the casing, each door is hinged upon or is connected to a rod 33 extending through the walls of the casing and terminating at the outside of the refrigerator with a control arm 34 secured thereto and having a spring pressed catch 35 at its outer end movable over a segment or plate 36 fixed at the front of the casing. In the plate are a number of holes 37 arranged in the path of the catch 35 and adapted to engage the extremity thereof for holding the arm and consequently the rod and door attached thereto in any desired position, either entirely open, entirely closed, or in any one of a number of intermediate positions.

With this construction, it is apparent that the freezing apparatus housing or casing may have a door at the front and back for access to each end of its compartment 20, or two or more of such compartments may be arranged in end to end relation so that the compartment may be loaded or charged at one end of the housing or casing, the material being then pushed through and removed from the other end of the housing or casing for continuous or commercial operation. During the charging and discharging operation, the separate compartments may be closed from the circulation of the cooling medium therethrough, without affecting the cooling circulation in the other compartments.

Likewise, a plurality of units of this kind or as shown in Fig. 1 may be laterally extended for large capacity or commercial installations, in which case the defrosting doors 15 would be omitted at the sides and additional doors 14 would be placed opposite the heat exchange and circulating units at the top of the casings. For multiple installations of this kind, some of the intermediate insulating walls may be omitted between the sections, but the operation of each section will remain substantially the same, all of the compartments at one section having a top entry at one side and a bottom entry at the opposite side with an interposed flow restricting plate or partition which insures a complete dispersion of the cooling medium throughout any compartment which is open to the passage thereof.

I claim:

1. An apparatus for freezing comestibles comprising a casing including a pair of opposed walls, structure including partitions which extend from one of said walls to the other, said structure dividing the interior of the casing into a chamber and a passage at each of the opposite sides thereof, solid panels extending from partition to partition and dividing said chamber into a plurality of non-communicating compartments, false bottoms having apertures therein and arranged one above each panel, each of said partitions having a set of openings therein, the openings of one set being arranged to place one of said passages in communication with the spaces above said false bottoms and the other set being arranged to place the spaces below said false bottoms in communication with the other of said passages, closures for said openings, means for operating said closures from the exterior of said casing, to selectively segregate one or more of said compartments from said passages, structure including a blower and a refrigerating unit for circulating air through said passages and said compartments, each of said opposed walls having openings therein arranged to permit comestibles to be put in each of said compartments at one end and withdrawn from the other end, and closures for the last mentioned openings; the combined areas of the openings of all of the false bottoms being so related to the normal output of the blower that sufficient pressure may be built up above the false bottom in each compartment to insure that refrigerated air traversing therethrough will circulate through all portions of the space above the false bottom in such compartment.

2. A structure in accordance with claim 1 including additional doors, movable to close communication to the circulating passages from said blower and refrigerator, and other doors movable to permit air from the exterior of the apparatus to be circulated by the blower across the refrigerating unit to defrost the same.

3. An appartus for freezing comestibles, comprising a casing including a pair of opposed walls, structure comprising partitions extending from one wall to the other dividing the interior of the casing into a chamber and inlet and outlet passages for the chamber, solid panels extending from partition to partition dividing said chamber into a plurality of non-communicating compartments, false bottoms having apertures therein arranged one above each panel, said partitions having openings therein to place one of said passages in communication with the spaces above said false bottoms and other openings arranged to place the spaces below said false bottoms in communication with the other passage, closures for said openings, and structure including a blower and a refrigerating unit for circulating air through said passages and said compartments, the walls of the casing having openings and closures therefor movable to permit comestibles to be put into each of said compartments from the outside of the casing and withdrawn therefrom, the combined areas of the openings of all of the false bottoms being so related to the normal output of the blower that sufficient pressure may be built up above the false bottom in each compartment to insure that the refrigerated air traversing therethrough will circulate through all portions of the space above the false bottom in each compartment.

4. A structure, in accordance with claim 3, in which said compartments are arranged one above the other in said casing.

5. In a quick freezing apparatus for comestibles, a casing including a pair of opposite walls, a structure therein including partitions and panels dividing the interior of the casing into a chamber and passages at the opposite sides thereof and dividing the chamber into a plurality of non-communicating compartments, false bottoms having apertures therein arranged in said compartments, the partitions each having sets of openings therein, one of said sets being arranged to place one of said passages in communication with the space at one side of each false bottom and the other set arranged to place the space at the other side of each false bottom in communication with the other passage, a structure including a blower and a refrigerating unit for circulating air through said passages and compartments, the combined areas of the openings of all of the false bottoms being so related to the normal output of the blower that sufficient pressure may be built up above the false bottom in each compartment to insure that the refrigerated air traversing therethrough will circulate through all portions of the space above the false bottom in each compartment.

6. An apparatus for freezing comestibles, comprising a casing including a pair of opposed walls, structure including partitions which extend from one of said walls to the other dividing the interior of the casing into a chamber and inlet and outlet passages at the sides thereof, said casing having end openings through which comestibles may be inserted and removed, solid panels extending from partition to partition and dividing said chamber into a plurality of non-communicating compartments, perforated panel means in each compartment between the inlet and outlet passages, each of said partitions having a set of openings therein, the openings of one set being arranged to place one of said passages in communication with the space at one side of each perforated panel means, and the other set of openings being arranged to place the spaces at the other side of each of said perforated panel means in communication with the other of said passages, and structure including a blower and a refrigerating unit for circulating air through said passages and said compartments, the combined areas of the openings of all of the perforated panel means being so related to the normal output of the blower that sufficient pressure may be built up at one side of each perforated panel means in each compartment to insure that refrigerated air traversing therethrough will circulate through all portions of the space at that side of the perforated panel in which pressure is built up.

7. In a quick freezing apparatus for comestibles, a casing including a pair of opposite walls, a structure therein including partitions and solid panels dividing the interior of the casing into a chamber and inlet and outlet passages at the sides thereof and dividing the chamber into a plurality of non-communicating compartments, perforated panel means in each compartment between the inlet and outlet, each of the opposite walls having openings therein arranged to permit comestibles to be put in each of said compartments at one end and withdrawn from the other end and also to be withdrawn from the same end, a set of openings in one of said partitions arranged to place one of said passages in communication with the space at one side of each perforated panel means and the other set of openings being arranged to place the space at the other side of each perforated panel means in communication with the other passage, and a structure including a blower and a refrigerating unit for circulating air through said passages and compartments, the combined areas of the openings of all of the perforated panels being so related to the normal output of the blower that sufficient pressure may be built up above the perforated panel means in each compartment to insure that the refrigerated air traversing therethrough will circulate through all portions of the space at that side of the panel means in which the pressure is built up.

GEORGE W. MATHEWS.